Dec. 21, 1926.
H. V. REED
1,611,558
DRIVEN PLATE FOR FRICTION CLUTCHES
Filed March 8, 1926
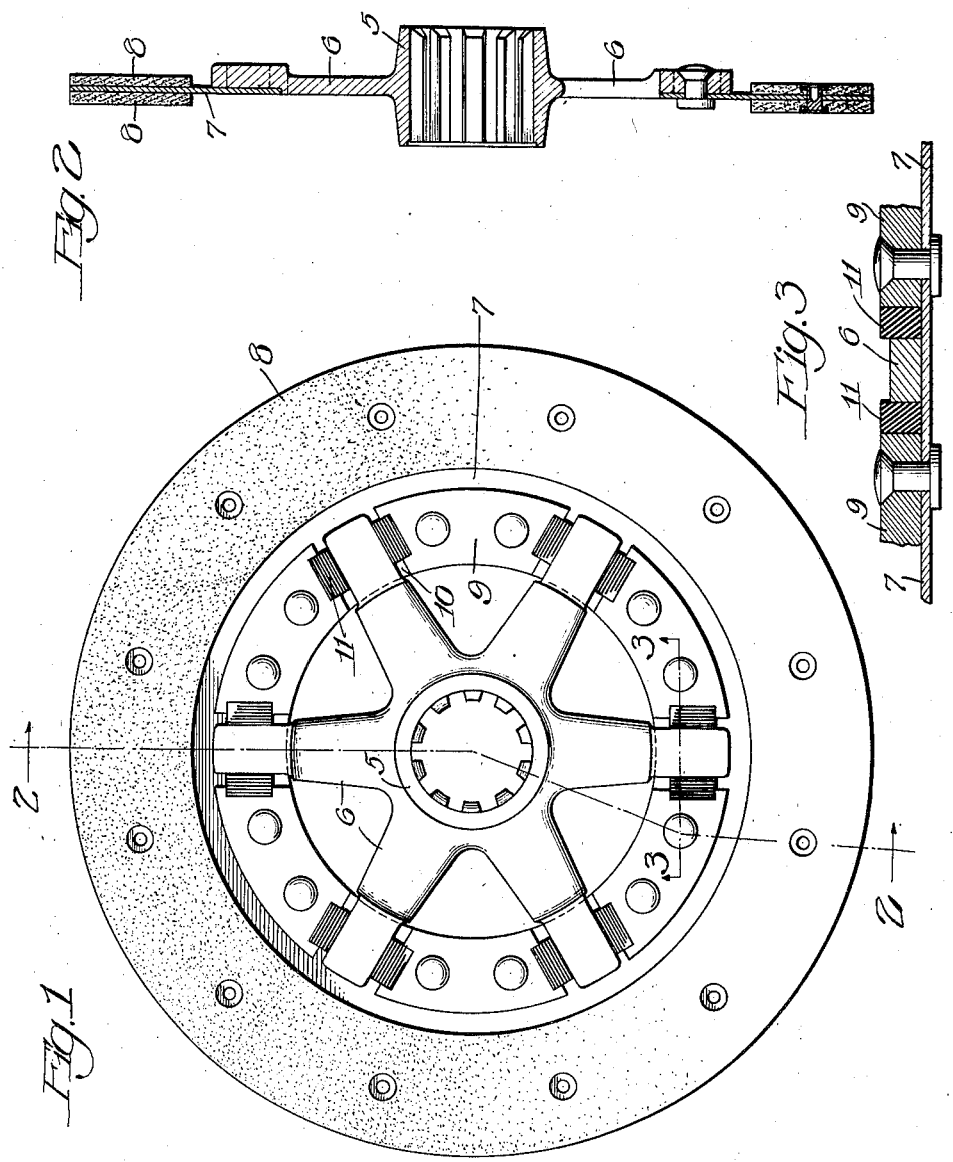
Inventor:
Harold V. Reed
By Wm O Bell Atty.

Patented Dec. 21, 1926.

1,611,558

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

DRIVEN PLATE FOR FRICTION CLUTCHES.

Application filed March 8, 1926. Serial No. 93,087.

Every internal combustion engine has its own natural period of vibration which is communicated to the transmission of a motor vehicle and produces chatter in the gears.

The object of this invention is to prevent the vibrations and noises of the engine from being communicated to the transmission by introducing a vibration absorber in the metal chain therebetween.

A further object is to provide a driven plate for friction clutches of novel construction which includes a cushion to prevent the vibrations and noises of the engine from being communicated to the transmission.

In the accompanying drawings illustrating a selected embodiment of the invention, Fig. 1 is an elevation of a driven plate of a friction clutch.

Fig. 2 is a sectional view on line 2—2 of Fig. 1.

Fig. 3 is a sectional view on line 3—3 of Fig. 1.

Referring to the drawings, the driven plate comprises an inner spider member having a hub 5 and a plurality of radial arms 6, and an outer ring member 7 faced with friction material 8. A plurality of blocks 9 are riveted or otherwise fastened to the ring member at intervals. The spaces 10 between adjacent ends of the blocks are of greater width than the outer ends of the spider arms and form seats to receive the arms which overlap the inner margin of the ring. Pads 11 of rubber or other suitable material are arranged in the ends of the blocks 9 to form cushion bearings for the spider arms.

The spider arms are thus provided with a yielding bearing driving connection with the ring member. The spider member and the ring member revolve together as one part and the rubber pads 11 provide cushions between the arms of the spider and the blocks of the ring and absorb all vibrations and noises which might otherwise be communicated from the engine to the transmission. This greatly improves the operation of an engine, clutch and transmission assembly, eliminates the chatter of gears in the transmission which has resulted from vibrations and noises of the engine communicated thereto, and thereby provides an assembly which runs with greater smoothness and less noise than has been customary heretofore. The cushioning of the plate absorbs the vibrations of the engine at its natural period and prevents these vibrations and the noises incident thereto from traveling through the ring of the clutch and to the transmission and other parts of the assembly. The cushions form a vibration absorber which interrupts the ordinary travel of the vibrations and noises of the engine and produces a quieter operation of parts which is particularly desirable in automotive vehicles.

The flat metal contact of the arms gives more rigid construction against lateral distortion due to the arms having their outer ends overlapping the inner margin of the ring member.

I am aware that changes in the form, construction and arrangement of parts may be made without departing from the spirit and without sacrificing the advantages of the invention and I reserve the right to make all such changes as fairly fall within the scope of the following claims.

I claim:

1. A driven plate for friction clutches, comprising an outer ring member, an inner spider member having a plurality of arms, the outer ends of the arms overlapping the inner margin of the ring member, and cushions on the ring member forming bearings for said arms.

2. A driven plate for friction clutches, comprising an outer ring member, an inner spider member having a plurality of arms, the outer ends of the arms overlapping the inner margin of the ring member, blocks on the ring member spaced apart to form seats for the ends of the arms, and cushions at the ends of the blocks forming bearings for the arms.

HAROLD V. REED.